March 29, 1966 H. W. NORTON 3,242,675
APPARATUS FOR THE TRANSMISSION OF POWER BY A FLUID MEDIUM
Filed Aug. 6, 1962 6 Sheets-Sheet 1

INVENTOR
Harry Wm. Norton
By Watson, Cole, Grindle & Watson
ATTORNEYS

March 29, 1966     H. W. NORTON     3,242,675
APPARATUS FOR THE TRANSMISSION OF POWER BY A FLUID MEDIUM
Filed Aug. 6, 1962     6 Sheets-Sheet 2

March 29, 1966 H. W. NORTON 3,242,675
APPARATUS FOR THE TRANSMISSION OF POWER BY A FLUID MEDIUM
Filed Aug. 6, 1962 6 Sheets-Sheet 3

INVENTOR:
Harry Wm. Norton

By Watson, Cole, Grindle & Watson
ATTORNEYS.

March 29, 1966  H. W. NORTON  3,242,675
APPARATUS FOR THE TRANSMISSION OF POWER BY A FLUID MEDIUM
Filed Aug. 6, 1962  6 Sheets-Sheet 5

United States Patent Office 3,242,675
Patented Mar. 29, 1966

3,242,675
APPARATUS FOR THE TRANSMISSION OF
POWER BY A FLUID MEDIUM
Harry William Norton, Ludlow, England, assignor to
F. W. McConnel Limited, Ludlow, England, a British
company
Filed Aug. 6, 1962, Ser. No. 215,030
Claims priority, application Great Britain, Aug. 9, 1961,
28,782/61, 28,832/61
24 Claims. (Cl. 60—54.5)

This invention relates to the apparatus for the transmission of power by a fluid medium and has for an object to provide an arrangement which will enable considerable power to be transmitted without the production of harmful heating effects.

According to this invention an apparatus for the transmission of power by a fluid medium comprises a double acting pump having relatively reciprocal piston and cylinder arranged to be driven by a power unit the ends of which pump cylinder are connected respectively, in closed circuit, through two passages, with the ends of a motor cylinder containing a piston whereby relative reciprocatory movement is effected between these parts of the motor by the varying pressures generated at the ends of the pump cylinder and wherein the volume swept out by the pump piston is greater than that swept out by the motor piston and the excess fluid from the motor cylinder passes to exhaust through valve means which is opened consequent upon the movement of the motor piston towards each limit of its stroke and is closed when the piston is moved away from said limits.

The swept volume of the pump cylinder may be greater than that of the motor cylinder.

The pump cylinder may be provided with valve means which place the cylinder into communication with a source of fluid consequent upon the movement of the pump piston towards each end of the cylinder. Said valve means may comprise a port at or near the centre of the pump cylinder which is arranged to be uncovered by the piston towards each end of its stroke. Where said fluid comprises a liquid there is provided a reservoir with which a centre port of the motor cylinder is connected by a passage so as to permit the excess liquid due to different volumes swept out by the two pistons to be returned to the reservoir. By these means the continuous circulation of liquid through the reservoir maintains the liquid comparatively cool.

Each passage connecting the ends of the cylinders together may communicate with the liquid reservoir through a pressure relief valve so that should the motor piston become jammed e.g. by over load before it uncovers the central port the pressure built up on one side of it by continued movement of the pump piston is relieved.

For similar reasons the pump cylinder may be provided with an automatic inlet valve at each end thereof so as to permit the piston to draw in liquid from the liquid reservoir when it is no longer supplied by the movement of the motor piston.

The said passages between the ends of the cylinders may be cross-connected by a passage having non-return valves at its ends opening towards one another and which cross passage communicates through a pressure relief valve with the passage which leads from the central port of the motor cylinder to said reservoir.

In the case where air is used as the fluid medium the aforesaid central ports of the two cylinders may communicate with the atmosphere and the passages connecting the ends of the two cylinders are provided with non-return valves which open towards the motor cylinder, thus as the motor piston approaches each end of its stroke air is trapped and compressed in the motor cylinder and cushions the piston at the end of its stroke.

In such an arrangement the swept volumes of the pump piston and the motor piston may be sufficiently different to provide the required compression ratio to operate the motor through its full stroke against the normal maximum operating load. Should the load decrease then the working stroke will be completed before the pump piston reaches the end of its stroke and the aforesaid central port of the motor cylinder opens to permit air to pass out from the motor cylinder.

In any of the arrangements referred to above the pump piston may be reciprocated by a piston rod which projects through both ends of the cylinder.

One form of this kind of pump according to the invention comprises an arrangement in which reciprocation of the piston is obtained by providing the opposed faces of either or each end wall of the cylinder and either or each end of the piston with a cam track and cam follower so shaped that relative rotation between the cylinder and piston generate reciprocal movement between them and means for imparting said rotation.

The following is a description of a number of embodiments of the invention, reference being made to the accompanying diagrammatic drawings, in which.

Like reference numerals refer to like parts in each of the figures of the drawings.

In the arrangement shown in FIGURE 1 there is disposed immediately below reservoir 10 for liquid a pump cylinder 11 containing a reciprocal piston 12. Attached to the piston is a piston rod 13 which extends through a gland 14 in the end wall of the cylinder, which gland is provided with a passage 15 leading to the reservoir 10. The piston rod 13 is reciprocated by a crank and connecting rod assemblage 16, 17 which is driven by a shaft 18 by a prime mover. The cylinder may be provided with automatic inlet valves 34 or a central inlet port 19 communicating with the reservoir. The length of the piston 12 and of the cylinder and the stroke of the piston are such that the piston uncovers the port 19 towards each end of its stroke. The cylinder 11 is connected at opposite ends by passages 20 and 21 to the opposite ends of a smaller bore cylinder 22 containing a reciprocal piston 23 attached to a piston rod 24 which is connected to the mechanism which is to be driven.

An exhaust port 25 is arranged at the centre of the cylinder and communicates with a passage 26 leading back to the reservoir 10 also the passage 26 communicates with a gland 27 at the end of the cylinder 22 which gland encircles the piston rod 24. The end walls of the motor cylinder are provided with inwardly extending bosses 28 which towards the end of the stroke project loosely into recesses 29 formed in the piston. The bosses thus trap liquid in the recesses which can only leak out slowly resulting in damping the movement of the piston at the end of each stroke.

The passages 20 and 21 are cross-connected by a passage 30 having non-return valves 31 at its ends opening inwardly towards one another. The cross-passage 30 communicates with another passage 32 through a pressure relief valve 33 and the passage 32 is connected to the passage 26 leading back to the reservoir. The ends of the cylinder 11 may also communicate with the reservoir 10 through non-return valves as at 34 or an inlet port 19. Assuming the parts are in the position shown in FIGURE 1 and the piston 12 is moving to the left, liquid will be displaced on the left hand side of the piston and pass downwardly through the passage 21 to the left hand end of the piston 23. Owing to the different swept volumes of the cylinders 11 and 22 the piston 23 will move to the right hand end of the stroke quicker than the piston 12 moves to the end of its stroke and after the port 25 has been uncovered by the piston 23 liquid will continue to flow through the passage 21 and the cylinder 22 into the passage 26 leading back to the reservoir. In the meantime the piston 23 in moving quickly to the right hand end of its cylinder will provide sufficient liquid to the right hand side of the piston 12 to compensate for part of its displacement and after the piston 23 has come to the end of its stroke the piston 12 will continue and either uncover the port 19 when further liquid will flow to the right hand side of the piston from the reservoir or draw this liquid through valve 34. Upon the return stroke to the right of the piston 12 the displaced liquid on the right hand side of it will pass down through the passage 20 to the right hand side of the piston 23 forcing it to the left and a similar cycle takes place to that described above.

Should the piston 23 become jammed before reaching the end of its stroke so that the port 25 is closed and there is continued movement of the piston 12, then the pressure in one of the passages 20 or 21 will cause the non-return valve 31 to open and the fluid under pressure will open the pressure relief valve 33 and liquid will flow back to the reservoir.

The passage 30 may be connected to an auxiliary pipeline 35 controlled by a valve 36, for example, where the mechanism is used on a tractor for driving a vegetation cutter and the cutter is adjustable in an up and down direction or a fore and aft direction by suitable rams, the auxiliary pipeline 35 may be used for energising said rams. The shaft 18 may be driven from the power take-off shaft of the tractor through suitable gearing.

Figure 2:
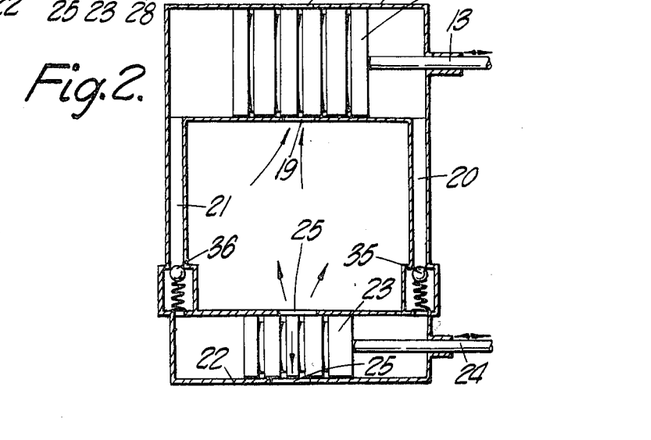
FIGURE 2 is a section through an alternative form of apparatus similar to that of FIGURE 1 but in which air is used as the fluid medium.

In the case where air is employed as a medium a simpler arrangement may be provided as shown in FIGURE 2. Again in this instance the opposite ends of the cylinders 11 and 22 are connected by passages 20 and 21 and the cylinders are provided mid-way along their length with ports 19 and 25 which are uncovered by the pistons 12 and 23 towards the ends of the stroke. The only additional parts which may be required in this case are non-return valves 35, 36 in the passages 20, 21 which open towards the cylinder 22. Again in this instance the diameter of the cylinder 11 is greater than that of the cylinder 22.

Assuming the parts are in the position shown in FIGURE 2 and the piston 12 is moving to the left, air will be compressed on the left hand side of the piston and will open the non-return valve 36 placing the left hand end of the piston 23 under pressure whereby it is moved to the right. The non-return valve 35 will be closed and air will be compressed on the right hand end of the piston having a cushioning effect, but owing to the piston 23 being of smaller diameter than the piston 12 there will be sufficient pressure on the left hand side to move it to the right. As soon as the piston 23 uncovers the port 25 air will pass out through the port 25 until the piston 12 reaches the left hand end of its stroke. When the piston 12 returns the valve 35 will open and the valve 36 close and a similar cycle will take place. Instead of a port 19 being provided at the centre of cylinder 11 there may be provided conventional automatic inlet valves at the ends of the cylinders. The swept volume of the pump and motor cylinders are sufficiently different to provide the necessary pressure to operate the motor piston for its full stroke against the normal operational load. Should the working load be less, then the working stroke will be completed before the pump piston has reached the end of its stroke and the exhaust port 25 opens relieving the pressure in both the pump and motor cylinders.

Figure 1:
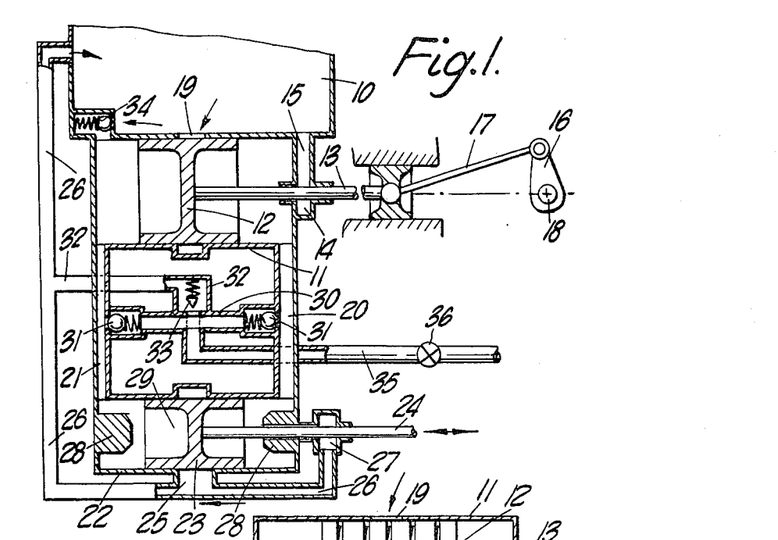
FIGURE 1 is a section through one form of apparatus in which the pulse generator comprises a reciprocatory pump and in which a liquid may be used as the fluid medium.
Figure 3:
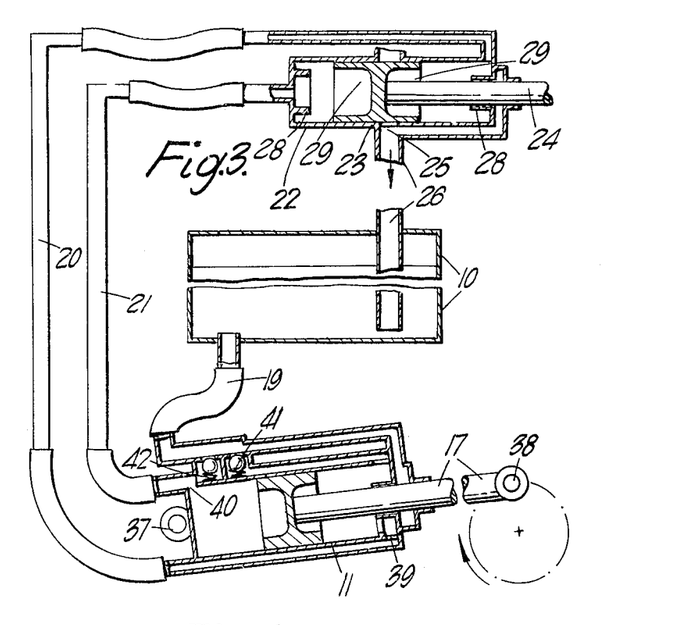
FIGURE 3 is a section through a similar apparatus to that of FIGURE 1 and embodying a reciprocatory pump having a rocking cylinder.

The arrangement shown in FIGURE 3 is similar in most respects to the arrangement shown in FIGURE 1 but differs mainly in the form of pump. The cylinder 11 is pivoted at 37 and the piston rod 17 is connected directly to a revolving crank pin 38. The two passages 20, 21 communicate with the ports 39, 40 at opposite ends of the cylinder and also communicate through automatically actuating non-return valves 41, 42 with the passage 19 leading back to the reservoir 10 and which valves open inwardly towards the pump cylinder.

The arrangement of the motor is almost identical to that of FIGURE 1.

Figure 4:
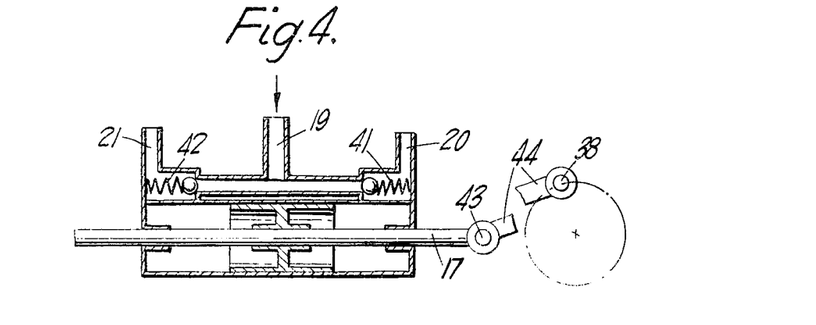
FIGURES 4, 5 and 6 are sections through various forms of reciprocatory pump which may replace the pump employed in either of the arrangements shown in FIGURE 1 or FIGURE 3.

FIGURE 4 shows a double acting pump somewhat similar to that of FIGURE 3 with the exception that the piston rod 17 extends out through opposite ends of the cylinder and is pivotally connected at 43 to one end of a connecting rod 44 the other end of which is pivotally connected to the crank pin 38. Also the automatically operating valves 41, 42 are similarly disposed.

Figure 5:
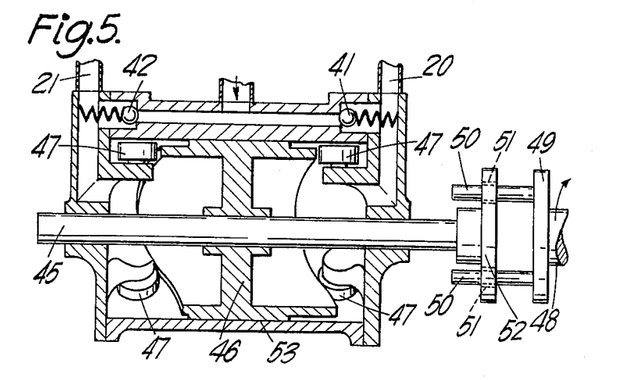

In the arrangement shown in FIGURE 5 the cylinder and valve arrangement is similar to that described in FIGURE 4 and similar reference numerals are used for like parts. In this arrangement the piston 46 is fixed to a piston rod 45 which can both rotate and reciprocate.

The skirt of the piston extends on either side of the crown 53 and each end of the skirt has a sinuous edge having a number of crests and valleys.

Each crest on one edge of the skirt is disposed axially opposite a valley in the other edge of the skirt.

Rollers 47 rotatably mounted at opposite ends of the cylinder engage the sinuous edges of the skirt opposite them so that rotation of the shaft and piston imparts a reciprocatory movement to them.

The piston rod is connected to a driving shaft 48 by a coupling comprising a flange 49 on the driving shaft and carrying axially extending pins 50 which slidably engage holes 51 formed in a flange 52 fixed to the piston rod 45.

Figure 6:
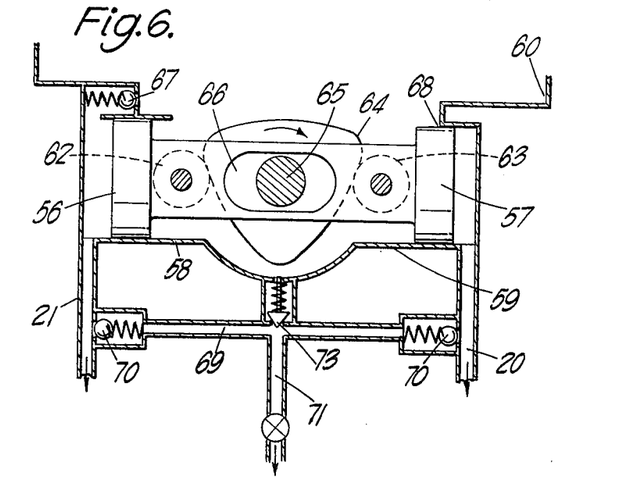

Another form of pulse generator is shown in FIGURE 6 which comprise two pistons 56, 57 arranged in two co-axially arranged cylinder parts 58, 59 the inner ends of which communicate directly with a reservoir 60 for hydraulic fluid.

The pistons are joined by a piston rod 61 on which are mounted rollers 62, 63 disposed on either side of a three-lobed cam 64. The cam is mounted on a shaft 65 which passes through a slot 66 in the piston rod and is driven from the power take-off shaft of the tractor through suitable clutch means.

The ends of the cylinder are connected respectively to the pipes 20, 21 of FIGURE 1 and are also connected either by a non-return valve 67 to the reservoir 60 or cavitation inlet 68.

The two pipes 20, 21 may be cross-connected by a passage 69 having non-return valves 70 at its ends and auxiliary power line 71 at its centre controlled by a valve 72. The cross pipe 69 may also be provided with a pressure relief valve 73 in communication with the reservoir 60 through the cylinder assemblage.

Figure 7:
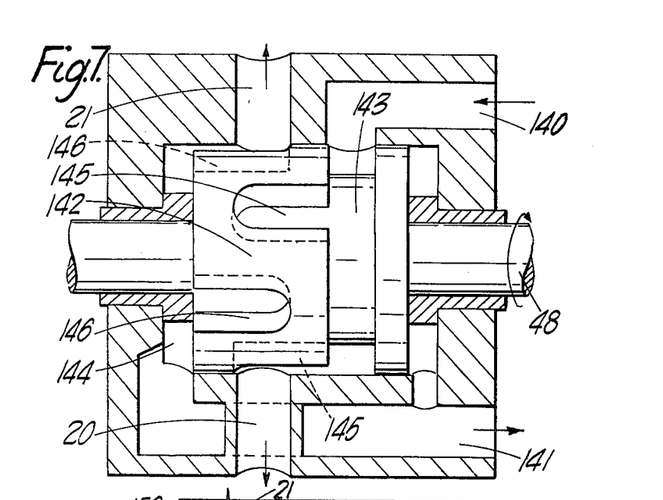
FIGURES 7 and 8 are sections through two forms of rotary pulse generator which, in conjunction with a source of high pressure and a source of low pressure, may replace the reciprocatory pump employed in any of the arrangements shown in FIGURES 1, 2 and 3.

A still further form of generator is shown in FIGURE 7 in which pipes 140, 141 leading from the high and low pressure sides of a hydraulic system of a tractor communicate with ports in a casing which encircles a rotating valve member 142 so that the pipes and ports are arranged opposite circumferential grooves 143 and 144 in said valve member. Extending laterally from the grooves 143 and 144 are two sets of slots 145 and 146 which alternate and overlap one another. The casing is also provided with ports which communicate with pipes 20, 21 leading to the ends of the motor cylinder and which ports are arranged in the paths of movement of the slots 145, 146 so that during rotation of the valve member first one pipe 20 transmits a pressure pulse and the other 21 communicates with the low pressure zone and then the pipe 21 transmits a pressure pulse and the other communicates with the low pressure zone.

The valve member 142 is fixed to a shaft 48 which may be rotated by the power take-off on the tractor through suitable clutch mechanism.

Figure 8:
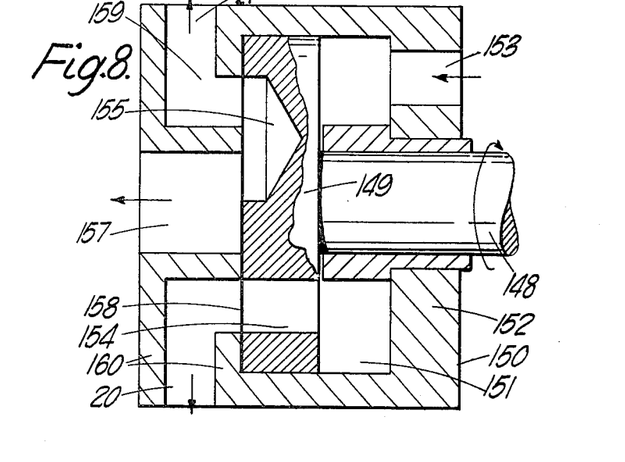

The arrangement shown in FIGURE 8 is similar to that shown above with the exception that a rotary ported and slotted distributor disc 149 is fixed to the shaft 148 within a casing 150 so that a gap 151 is formed between the plate and an end wall 152 of the casing, which gap is supplied with fluid under pressure through a pipe line 153.

The disc is provided with a set of ports 154 which alternate with the radial recesses 155 formed in that face further from the wall 152. The other end wall 160 is provided with ports 158, 159 having radial extensions leading to the pipes 20, 21 and also with a central axially extending port 157 arranged to communicate with a low pressure zone. The arrangement is such that when one of the ports 154 in the disc places the port 153 which communicates with the source of pressure into communication with the port 158 and pipe 20 the other pipe 21 is placed into communication with the low pressure zone through the ports 157 and recess 155 whereby the piston is moved from one end of its bore to the other.

Figure 9:
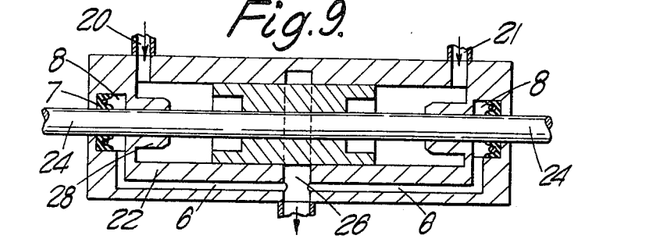
FIGURES 9, 10 and 11 are sections through various forms of reciprocatory motor which may replace the motor shown in either of the arrangements shown in FIGURES 1 and 3.

The motor shown in FIGURE 9 is somewhat similar to that shown in FIGURE 3. The piston rod 24, however, extends from both ends of the cylinder 22 and the ends of the cylinders are provided with gland housings 8 in which are located sealing rings 7. The gland housings communicate through passages 6 with the return pipe 26 to the reservoir.

The pipes 20, 21 communicate with ports near the ends of the cylinder instead of through the cylinder heads as in FIGURE 3.

Figure 10:
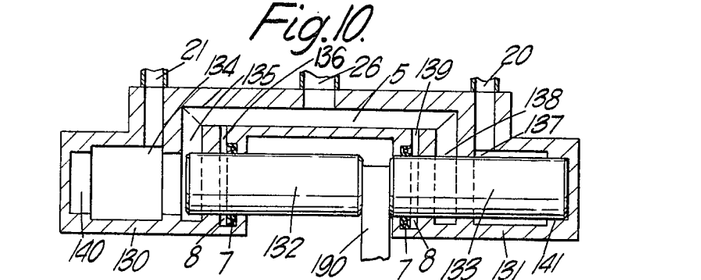

Referring now to FIGURE 10 instead of the motor comprising a double acting cylinder and piston motor as in FIGURE 1 it may comprise two single acting cylinders 130, 131 in which are reciprocal plungers 132, 133 respectively.

Disposed between adjacent ends of the plungers is a member 190 by which a drive is transmitted to the mechanism to be operated.

The cylinder 130 is provided with three ports 134, 135, 136 the first of which communicates with the pipe 21 and the other two of which communicate with a passage 5 leading to the return pipe 26 to the reservoir.

Similarly the cylinder 131 has ports 137, 138 139 the first of which communicates with the pipe 20 and the other two with the passage 5.

The part of the cylinder 130 to the right of the port 134 is a sliding fit with the plunger 132, whereas the part of the cylinder to the left of the port is of such a diameter as to provide a comparatively large clearance whereas the extremity of the cylinder at 140 only provides a comparatively small clearance into which the plunger projects at the end of its stroke thus providing a cushioning effect and similarly the part of the cylinder 131 to the left of the port 137 is a sliding fit with the plunger and the part to the right provides a comparatively large clearance, whereas the outer end 141 is of reduced diameter to provide a cushioning effect for that plunger.

In the position of the parts shown in FIGURE 10 the passage 20 is about to receive a pressure pulse which enters the port 137 and through the reduced space between the right hand end of the plunger and the cylinder so as to force it to the left when the plunger 132 will also be forced to the left causing fluid to be displaced through the port 134, through the passage 21 back to the pump cylinder.

This action continues to take place until the plunger 132 reaches the left hand end of its stroke when the right hand end of the plunger 133 commences to uncover the port 138. A pressure pulse then enters the passage 21 and passes to the end of the plunger 132 whereupon the plungers return to their original position. The ports 136 and 139 lead to gland housings 8 containing sealing rings 7 which encircle the plungers and ensure that any leakage of liquid past the plungers flows to the return passage 26.

Figure 11:
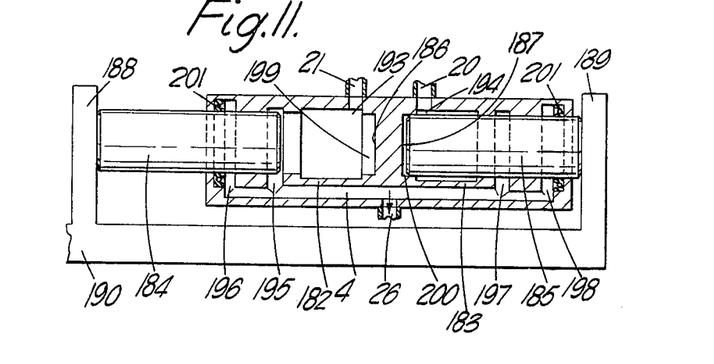

In the arrangement shown in FIGURE 11 two single acting cylinders 182, 183 and plungers 184, 185 are provided.

In this instance the closed ends 186, 187 of the cylinders are arranged adjacent one another and the plungers extend from the outer ends of the cylinders and engage abutments 188, 189 on a reciprocal shaft 190 by which a drive is transmitted to the mechanism to be operated.

The inner ends of the cylinders are provided with ports 193, 194 which communicate respectively with the passages 21, 20 from the pulse generator. The outer ends of the cylinders are provided with axially spaced ports 195, 196 and 197, 198 respectively which communicate with a passage 4 leading to the return pipe 26 to the reservoir.

The inner ends of the cylinders are reduced in diameter at 199, 200 for cushioning purposes and the opposite ends of the cylinders provide a sliding fit with the plunger and are also provided with fluid seals 201. The intermediate parts of the cylinder provide comparatively large clearances between them and the plungers.

In the position of the parts shown in FIGURE 11 the passage 20 will be receiving a pressure pulse and the left hand end of the plunger 185 will be subjected to pressure moving it to the right or moving the shaft 190 to the right through the abutment 189 and the other abutment 188 will move the plunger 184 to the right covering the port 195 and expelling liquid from the cylinder 182 through the port 193 and passage 21 back to the low pressure side of the pulse generator. The plunger 185 will eventually uncover the port 197 and the excess liquid delivered by the pulse generator will pass through that port and passage 4 and return pipe 26 to the liquid reservoir thus producing the aforesaid cooling effect.

A pressure pulse will then be generated in the passage 21 and pass through the port 193 to the right hand end of the plunger 184 driving it to the left. The plunger 185 will be driven to the left by the abutment 189 and liquid will be expelled through the port 194 to the low pressure side of the pulse generator and so on.

Figure 12:
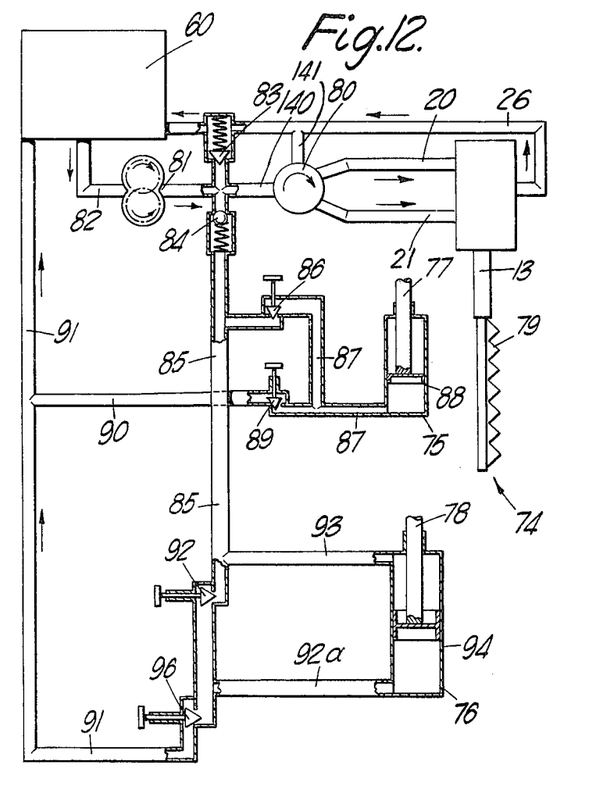
FIGURE 12 is a circuit showing diagrammatically a reciprocatory motor of the kind shown in any of FIGURES 1, 3, 9, 10 and 11 and a pulse generator of the kind shown in FIGURE 7 or FIGURE 8 in circuit with an hydraulic system of a tractor and arranged to drive a vegetation cutter having a reciprocating blade.

FIGURE 12 shows the invention applied to a vegetation cutter 74 suitable for mounting on a tractor so that it may be swung in an up and down direction and also in a fore and aft direction by rams indicated at 75, 76. The plungers 77, 78 are connected in known manner to the mounting of the vegetation cutter. The vegetation cutter is provided in known manner with a reciprocating blade 79 which is connected to the plunger rod 24 of the reciprocating motor shown in FIGURE 1.

The pressure pulse generator is indicated generally at 80 and is connected through the pipelines 20, 21 leading to the ends of the motor cylinder as shown for example in FIGURE 1.

The inlet pipe 140 of the pressure pulse generator communicates with the outlet of a hydraulic pump 81 driven by the tractor's engine the inlet side of which communicates through a pipe 82 with the hydraulic fluid reservoir 60, as does also the outlet pipe 26 of the reciprocating motor which actuates the cutter 74. The pipeline 40 also communicates with the fluid reservoir through a pressure relief valve 83 and through a non-return valve 84 with a pipeline 85. This pipeline communicates through a hand controlled valve 86 with a passage 87 leading to the cylinder 88 of the ram 75 so that when the valve 86 is opened the plunger 77 is moved in a direction to raise the cutter.

The valve 86 is interlinked with a further valve 89 so that when the valve 86 is closed the valve 89 may be opened and the ram can descend under the weight of the cutter and the exhaust liquid passes through the pipeline 90 which is connected to a pipeline 91 leading back to the reservoir 60.

Similarly the pipeline 85 is connected through a valve 92 to a pipeline 92a communicating with the base end of the cylinder 94 of the ram 76, the gland end of which cylinder is connected by a pipeline 93 to the pipeline 85. A further valve 96 connects the passage 92a through the pipe 91 to the reservoir 60 so that when one of the valves is opened and the other closed the plunger moves in one direction and when said one valve is closed and the other is open it moves in the opposite direction.

I claim:

1. Apparatus for the transmission of power by a fluid medium comprising a generator of pressure pulses, two passages connecting the pulse generator with the ends of a motor cylinder structure containing a piston assembly, the pulse generator delivering pulses of high pressure alternately through said passages so that relative reciprocating movement is effected between the piston assembly and the cylinder structure, the volume of fluid supplied to the motor during each stroke thereof being greater than the volume swept out by the piston assembly, whereby excess fluid is delivered to the motor, the pulse generator being arranged alone to deliver the whole of that volume of fluid, including the excess fluid, to the motor during the course of a pulse, valve means which place the cylinder structure on the high pressure side of the piston assembly into communication with exhaust during the last part of the movement of the motor piston assembly toward each limit of its stroke, the motor piston assembly being arranged to reach the limit of its stroke, and the valve means being arranged to open before the termination of the pulse from the pulse generator, so that said excess fluid is passed directly to exhaust from that end of the motor cylinder structure into which it is introduced by the pulse generator.

2. An apparatus according to claim 1 wherein the pulse generator comprises a double acting pump having relatively reciprocable piston and cylinder arranged to be driven by a power unit, the ends of which pump cylinder are connected respectively in closed circuit, through said two passages with the ends of the motor cylinder structure, and wherein the volume swept out by the pump piston is greater than that swept out by the motor piston assembly to provide said excess fluid.

3. An apparatus according to claim 1 wherein the pulse generator comprises a rotor rotatable within a casing provided with an inlet port communicating with a source of high pressure, a port communicating with a lower pressure zone and two further ports which communicate respectively through said two passages with the ends of the motor cylinder structure, and which rotor is provided with at least two ports so arranged in relation to the ports in the casing that for one position of the rotor one end of the motor cylinder structure is placed into communication with the source of high pressure and the other end of the motor cylinder structure is placed into communication with the lower pressure zone and continued rotation of the rotor from said position places the other end of the motor cylinder structure into communication with the high pressure source and the first said end will come into communication with the lower pressure zone and which source of high pressure and said rotor are so arranged that the volume of fluid supplied to said motor at each stroke is greater than the volume swept out by the piston assembly of said motor to provide said excess fluid.

4. An apparatus according to claim 1 wherein the motor cylinder structure comprises two cylinders fixed in relation to one another and wherein the piston assembly comprises two interconnected pistons one piston being slidable in each cylinder and the interconnection being so arranged that throughout their strokes said pistons are 180° out of phase so that the motor is double acting.

5. An apparatus according to claim 2 wherein the cross-sectional area of the pump piston is greater than that of the motor piston assembly.

6. An apparatus according to claim 1 wherein said valve means comprise a port in the cylinder structure communicating with exhaust which port is uncovered by the piston assembly during the last part of a stroke thereof.

7. An apparatus according to claim 6 wherein said piston assembly comprises a single piston arranged to uncover an exhaust port during the last part of movement of said piston toward each limit of its stroke.

8. An apparatus according to claim 6 wherein the motor cylinder structure comprises two cylinders each having an exhaust port and fixed in relation to one another and wherein the piston assembly comprises two interconnected pistons one piston being slidable in each cylinder and each of which pistons uncovers an exhaust port during the last part of its movement toward one limit of its stroke.

9. An apparatus according to claim 2 wherein said pump cylinder is provided with valve means which place each end of the cylinder into communication with a source of fluid consequent upon the movement of the pump piston toward each other end of the cylinder.

10. An apparatus according to claim 9 wherein said valve means comprise an inlet port at or near the center of the pump cylinder which is arranged to be uncovered by the piston toward each end of its stroke.

11. An apparatus according to claim 6 wherein the fluid comprises a liquid and there is provided a liquid reservoir with which the exhaust port of the motor cylinder structure is connected by a passage so as to permit the excess liquid to be returned to the reservoir.

12. An apparatus according to claim 6 wherein the fluid comprises a liquid and there is provided a liquid reservoir and wherein each passage leading from the ends of the motor cylinder structure communicates with the liquid reservoir through a pressure relief valve so that should the motor piston assembly become jammed, e.g., by overload before it uncovers the exhaust port the pressure built up on one side of it is relieved.

13. An apparatus according to claim 2 wherein the fluid comprises a liquid and there is provided a liquid reservoir and wherein the pump cylinder is provided with an automatic inlet valve at each end thereof so as to permit the pump piston to draw in liquid from the liquid reservoir when it is no longer supplied by the movement of the motor piston assembly.

14. An apparatus according to claim 1 wherein the fluid comprises a liquid and there is provided a liquid reservoir and wherein the passages from the ends of the motor cylinder structure are cross connected by a passage having non-return valves at its ends opening toward one another and which cross passage communicates through a pressure relief valve with a passage which leads from a central port of the motor cylinder structure to said reservoir which central port comprises the aforesaid valve means.

15. An apparatus according to claim 10 wherein there is provided an exhaust port near the center of the motor cylinder structure which is arranged to be uncovered by the piston assembly toward each end of its stroke and wherein said fluid is air and the exhaust port of the motor cylinder structure and the inlet port of the pump communicate with the atmosphere and the ports at the ends of the motor cylinder structure communicate with the ends of the pump cylinder with non-return valves opening toward the motor cylinder structure.

16. An apparatus according to claim 15 wherein the swept volumes of the pump piston and the motor piston assembly are sufficiently different to provide the required compression ratio to operate the motor through its full stroke against the normal maximum operating load.

17. An apparatus according to claim 2 wherein said pump piston is reciprocated by a piston rod which projects through both ends of the pump cylinder.

18. An apparatus according to claim 2 wherein said pump piston is reciprocated by providing the opposed faces of at least one end wall of the cylinder and the corresponding end of the piston with a cam and follower so shaped that relative rotation between the cylinder and piston generate reciprocal movement between them, and means for imparting said rotation.

19. An apparatus according to claim 18 wherein both ends of the piston of the cylinder are provided with a cam and follower and wherein the cam tracks at opposite ends of the pump are complementary shaped so that a rise on one is opposite a fall on the other.

20. An apparatus according to claim 19 wherein the cam tracks are formed on the piston and the cam followers are mounted on the cylinder.

21. An apparatus according to claim 2 wherein the pump piston is reciprocated by a cam driven by said power unit and arranged between abutments on a piston rod connected to the piston.

22. An apparatus according to claim 21 wherein the cam is provided with three lobes.

23. An apparatus according to claim 1 wherein means are provided for damping the movement of the motor piston assembly as it approaches a limiting position at a closed end of the motor cylinder structure.

24. An apparatus according to claim 23 wherein means are provided for damping the movement of the motor piston assembly as it approaches a limiting position at a closed end of the motor cylinder structure and wherein said damping is produced by said cylinder structure comprising a stepped cylinder having smaller diameter portions at its closed ends into which the piston assembly extends at the limit of its travel and which piston assembly has a substantial clearance with that part of the cylinder provided with the port through which the pressure pulse passes into the cylinder and with a lesser clearance in the smaller diameter portion so that at the end of a stroke, fluid trapped is subjected to drag as it passes through the lesser clearance to the larger part of the cylinder and thence through said port which is then communicating with the lower pressure zone.

References Cited by the Examiner
UNITED STATES PATENTS

| 2,602,434 | 7/1952 | Barnaby | 60—54.5 X |
| 2,882,685 | 4/1959 | Carlsen et al. | 60—54.5 |
| 3,040,533 | 6/1962 | Heinrich | 60—54.5 |
| 3,048,978 | 8/1962 | Hare | 60—54.5 |

FOREIGN PATENTS 420,059  10/1925  Germany.

SAMUEL LEVINE, *Primary Examiner.*
ROBERT R. BUNEVICH, *Examiner.*